(12) United States Patent
Bornschier et al.

(10) Patent No.: US 6,622,834 B2
(45) Date of Patent: Sep. 23, 2003

(54) HYDRODYNAMIC TORQUE CONVERTER

(75) Inventors: Bernd Bornschier, Schwelm (DE); Michael Sengpiel, Wuppertal (DE); Vladimir Premiski, Audenge (FR)

(73) Assignee: Ford-Werke-Aktiengesellschaft, Cologne (DE)

(*) Notice: Subject to any disclaimer, the term of this patent is extended or adjusted under 35 U.S.C. 154(b) by 0 days.

(21) Appl. No.: 09/996,942

(22) Filed: Nov. 29, 2001

(65) Prior Publication Data

US 2002/0073701 A1 Jun. 20, 2002

(30) Foreign Application Priority Data

Nov. 29, 2000 (DE) .......................... 100 59 343
Jul. 5, 2001 (DE) .......................... 101 32 065

(51) Int. Cl.[7] ............................................. F16H 45/02
(52) U.S. Cl. ........................................ 192/3.29; 192/212
(58) Field of Search ............................. 192/3.29, 3.3, 192/212, 214, 113.36

(56) References Cited

U.S. PATENT DOCUMENTS

| | | | | | |
|---|---|---|---|---|---|
| 3,252,352 A | * | 5/1966 | General et al. | ............ | 192/3.29 |
| 3,839,864 A | * | 10/1974 | Ahlen | ........................ | 192/3.3 |
| 3,893,551 A | * | 7/1975 | Ahlen | ........................ | 192/3.29 |
| 4,440,276 A | * | 4/1984 | Kubo et al. | ................. | 192/3.29 |
| 4,540,076 A | * | 9/1985 | Bopp | ........................ | 192/3.29 |
| 4,702,721 A | * | 10/1987 | Lamarche | .................... | 192/212 |
| 5,037,272 A | * | 8/1991 | By | .............................. | 416/180 |
| 5,660,258 A | * | 8/1997 | Bacon et al. | ............... | 192/3.29 |
| 5,813,505 A | * | 9/1998 | Olsen et al. | ............... | 192/3.29 |
| 5,996,750 A | | 12/1999 | Roshangar | | |
| 6,024,195 A | | 2/2000 | Hinkel | | |
| 6,056,093 A | | 5/2000 | Hinkel | | |
| 6,065,575 A | | 5/2000 | Shimizu et al. | | |

FOREIGN PATENT DOCUMENTS

| | | |
|---|---|---|
| EP | 0 002 025 A1 | 5/1979 |
| EP | 1 022 491 A2 | 7/2000 |
| WO | WO-93/13338 A1 | 7/1993 |
| WO | WO-99/45294 A1 | 9/1999 |
| WO | WO-00/01962 A1 | 1/2000 |

* cited by examiner

*Primary Examiner*—Rodney H. Bonck
(74) *Attorney, Agent, or Firm*—Patzik, Frank & Samotny Ltd.

(57) ABSTRACT

A hydrodynamic torque converter has a converter housing drivable in rotation by an engine, with an impeller. A turbine non-rotatably connected to an output shaft is hydrodynamically coupled to the impeller by way of a stator through an oil circuit. The turbine is axially slidably supported on the shaft. A friction surface on the turbine upon axial displacement of the turbine comes into frictional contact with a counterpart friction surface on the converter housing, thereby producing a lockup clutch effect. The turbine is also connected by way of springs to a coupling element arranged non-rotatably on the shaft. In an alternative configuration the turbine is arranged non-rotatably on the shaft and the lockup clutch action is by way of friction surfaces on a coupling element and on the converter housing. A torsion damper can be provided between the coupling element and the turbine.

6 Claims, 12 Drawing Sheets

HYDRODYNAMIC TORQUE CONVERTER

FIELD OF THE INVENTION

The invention generally concerns hydrodynamic torque converters.

BACKGROUND OF THE INVENTION

A conventional hydrodynamic torque converter typically includes a converter housing rotatably mounted on a shaft and which is connected to a drive and to a pump wheel or impeller. A turbine wheel is supported rotatably relative to the converter housing and is coupled to the shaft and hydrodynamically to the impeller. The torque converter further includes a bridging or lockup clutch to produce a friction coupling between a friction surface operably associated with the converter housing and a friction surface operably associated with the turbine.

Such a hydrodynamic torque converter can be used more particularly in a motor vehicle in order to transmit torque produced by an internal combustion engine to a transmission or to the wheels of the vehicle by way of a shaft. A typical torque converter of that general kind is to be found for example in WO 93/13338. The converter housing of that torque converter, which is mounted rotatably about the shaft as referred to above, is connected to a drive coming from the internal combustion engine, while in its interior it has the impeller or pump wheel that is fixedly connected to the converter housing. The arrangement of the turbine wheel which is supported rotatably on the shaft relative to the converter housing and a stator operatively disposed between the turbine and the impeller is such that, when the converter housing is rotated by the drive from the internal combustion engine, a hydrodynamic pressure is built up in the oil filling in the converter, and a circulatory flow of the oil by way of the impeller, the stator and the turbine takes place. Suitable shaping of the vanes of the impeller, stator and turbine, and supporting the stator by way of a freewheel unit, provides an increase in torque when the vehicle starts moving. In addition, the hydrodynamic coupling between the engine drive and the output shaft permits a gentle start without a clutch, and fluctuations in torque from the internal combustion engine can be appropriately damped.

The torque converter of above-mentioned WO 93/13338 also includes a bridging or lockup clutch. When the converter housing with the impeller and the turbine driven thereby with its shaft have reached approximately the same speed of rotation, the lockup clutch can be closed to produce a force-locking mechanical coupling between the converter housing and the shaft. In that way, in what is referred to as the clutch range in which the engine drive and the shaft are rotating at approximately the same speed, the hydrodynamic coupling, which suffers from an energy loss in that situation, is replaced by a mechanical coupling action. In that arrangement the lockup clutch is embodied by one or more friction surfaces with associated counterpart surfaces, of which one is associated with the converter housing and the other to the turbine. In order to engage the lockup clutch the two friction surfaces, which are disposed in mutually opposite relationship at an axial spacing in the inoperative condition of the clutch, are brought into contact with each other whereby the converter housing and the turbine are coupled together.

From the point of view of the structure involved, the lockup clutch in a torque converter as in WO 93/13338 is embodied by the provision of a disk-shaped member which is referred to as a piston and which is axially slidably supported on the shaft and non-rotatably connected to the converter housing. The piston has a first friction surface disposed thereon, which is in opposite relationship to a second friction surface provided on the converter housing. Disposed between those two friction surfaces is a coupling element connected by way of a torsion damper to the turbine. In the opened or disengaged condition of the lockup clutch, the friction surfaces on the piston and the converter housing on the one hand and on the coupling element on the other hand are spaced from each other so that no coupling action takes place therebetween. In the closed or engaged condition of the lockup clutch on the other hand the piston is to be displaced axially towards the cover part of the converter housing which is at the engine side, and thereby clamps the coupling element disposed between it and the converter housing. As a result, the corresponding friction surfaces come into contact with each other so that the coupling element affords a force-locking frictional coupling effect between the converter housing and the turbine.

As already mentioned above, the coupling element in the torque converter of WO 93/13338 is coupled to the turbine by way of a torsion damper. That torsion damper comprises coil springs that extend in the peripheral direction of the converter and which are mounted to the outer shell portion of the turbine, one end of the coil springs being supported on the turbine and the other end on the coupling element. The springs are thus connected in serial relationship into the path of the flow of force from the coupling element to the turbine and provide that torque peaks and fluctuations originating from the drive or the converter housing can be appropriately damped and compensated as they are passed to the turbine and to the shaft respectively.

SUMMARY OF THE INVENTION

Therefore, a first object of the invention is to simplify the design of a hydrodynamic torque converter with lockup clutch so as to afford a more compact structure and reduced production costs together with a lower susceptibility to faults.

Another object of the present invention is to provide a hydrodynamic torque converter with lockup clutch which is of a more rational construction and an enhanced mode of operation with the elimination of some potential area of wear.

Still another object of the present invention is to provide a hydrodynamic torque converter incorporating a lockup clutch, so as to afford a mechanically simple operating procedure for engagement of the lockup clutch.

In accordance with the principles of the present invention, the foregoing and other objects are attained by a hydrodynamic torque converter including a converter housing which is rotatable about a shaft, and which is connected to a drive such as an internal combustion engine, and to an impeller. A turbine is supported rotatably relative to the converter housing, is coupled to the shaft, and is hydrodynamically coupled to the impeller. A lockup clutch produces friction coupling between a friction surface operably associated with the converter housing and a friction surface operably associated with the turbine. The turbine is axially slidably supported, whereby axial sliding movement of the turbine causes the friction surfaces to be brought into contact with each other.

As will be seen from a description hereinafter of preferred embodiments of the invention, the hydrodynamic torque converter according to the invention provides that an input torque coming from a suitable drive is hydrodynamically transmitted by way of the converter housing and the impeller to the turbine, which delivers the torque in converted mode to the output by way of the shaft. By way of the lockup clutch, mechanical coupling between the converter housing and the turbine can be produced in parallel with or alternatively to the hydrodynamic coupling condition, when the friction surfaces have been brought into contact with each other.

As in accordance with the invention, contact is made between those friction surfaces and thus the lockup clutch is closed by axial sliding movement of the turbine. Therefore, there is accordingly no need to provide an additional axially slidably mounted element, as referred to in the prior constructions, and this elimination of such an element can reduce the structural complication and expenditure, and thus reduce the production costs of the torque converter, avoid a potential wear point, and make it possible for the torque converter to be of a more compact configuration.

In this respect, the hydrodynamic coupling action which may possibly occur between the impeller and the turbine, due to the axial displacement of the turbine, does not result in any detrimental effects in terms of the transmission characteristics of the torque converter as, when the lockup clutch is closed or engaged, the hydrodynamic coupling effect is in any case not being used.

In accordance with a preferred feature of the invention the hydrodynamic torque converter includes a torsion damper for dampening the torque transmission between the drive and the shaft. That makes it possible to compensate for and equalise torque peaks and shocks and fluctuations in the torque produced by the engine, and this arrangement makes it possible to provide a smooth torque delivery.

In a first configuration in accordance with that feature, the torsion damper is arranged in the force-transmitting connection between the turbine and the associated friction surface of the lockup clutch. In other words, the torsion damper dampens the torque transmitted to that friction surface when the lockup clutch is engaged, before the torque is transmitted to the turbine. That arrangement provides for a more gentle engagement characteristic on the part of the lockup clutch as well as absorbing torque peaks and fluctuations when the lockup clutch engaged. In contrast, when the lockup clutch is open or disengaged, the torsion damper is out of operation so that the torque hydrodynamically transmitted from the impeller to the turbine is transmitted unchanged to the shaft.

In accordance with another configuration of this feature the torsion damper is operably disposed between the turbine and the shaft. In that position, it dampens the transmission of torque from the turbine to the shaft, irrespective of whether the torque is being transmitted hydrodynamically by the impeller or by engagement of the lockup clutch to the turbine. Accordingly when the torsion damper is arranged as such, it affords general torque smoothing prior to the torque being delivered by way of the shaft.

In a further preferred feature of the invention, the torsion damper includes at least one peripherally extending spring mounted to the outer shell portion of the turbine, the spring having one end supported on the turbine and another end supported on a coupling element that is rotatable relative to the turbine. Preferably, the torque converter has a plurality of such springs that are distributed in a symmetrical arrangement over the periphery of the turbine. By virtue of the way in which they are supported, the springs are disposed in serial relationship in the path of force transmission between the coupling element and the turbine so that they can implement smoothing of the torque by virtue of the resiliency of the springs. Relative rotary movement between the coupling element and the turbine can also be damped by friction according to the desired transmission characteristics.

In a preferred feature of the last-mentioned design configuration of the torsion damper, the coupling element has at least one peripherally extending slot, through which engages a projection protruding axially away from the outer shell portion of the turbine. The combination of the slot and the projection permits relative rotary movement as between the turbine and the coupling element, but that relative rotary movement is limited by virtue of the first and second ends of the slot butting against the projection protruding through the slot.

In a preferred feature, the torque converter has means for sealing the slot relative to the projection so that a pressure medium can be at different pressures on the two sides of the coupling element. A particularly simple form of such sealing means can provide that the coupling element lies flat and thus in a condition of sealing integrity against the outside of the turbine. Sealing integrity of the surfaces which are in a condition of bearing against each other is primarily achieved by clamping or bracing springs or other clamping or bracing elements which are fixed on the projection, which apply a predetermined force to the opposite side of the coupling element to brace the sealing surfaces into contact with each other. In addition, preferably in the region of engagement of the projection into the slot, it is possible to afford adjustable friction between the coupling element and the turbine, by means of which it is possible to set desired damping characteristics in the transmission path between the coupling element and the turbine.

In accordance with yet another preferred feature of the invention, the friction surface operably associated with the turbine is provided on the above-mentioned coupling element. With that design configuration, when the lockup clutch is closed, the coupling element is non-rotatably operably associated with the converter housing by way of the friction surface, and transmission of the torque from the coupling element to the turbine is smoothed out by virtue of the interposed torsion damper.

Another design configuration of the torque converter provides that the friction surface operably associated with the turbine is on the outer shell portion of the turbine. This means that the turbine can involve frictional contact with the converter housing directly by way of that friction surface, without the need for elements disposed therebetween. Implementing frictional contact between the turbine and the converter housing is made possible by virtue of the turbine being axially slidably mounted.

In a further preferred embodiment, at least one of the friction surfaces involved in the lockup clutch and which are operably associated with the turbine and to the converter housing respectively can be made from an aluminum-casting alloy. The material can be refined by the addition of various alloying constituents. Preferably, the friction surface operably associated with the turbine is made from the same material as the turbine, which preferably also comprises an aluminum-casting alloy.

In a preferred embodiment, a vacuum pressure casting process is used to produce the turbine.

As an alternative, the turbine and/or the converter housing may also be made from other casting materials or from plastic material.

Furthermore, in a preferred feature of the invention, at least one of the friction surfaces of the lockup clutch can be made from steel. In particular the combination of a friction surface comprising steel and a friction surface comprising aluminum alloy has advantageous sliding properties.

Furthermore, at least one of the friction surfaces may have oil flow passages through which the pressure medium in the interior of the torque converter can flow when the lockup clutch is closed or closing. That flow of pressure medium can positively influence the resulting frictional contact between the friction surfaces and can also dissipate frictional heat from the friction surfaces.

A preferred development of the invention provides that the torque converter has passages for a pressure medium, the arrangement being such that, by way of a suitable feed line for the pressure medium by way of those passages, the two sides of the turbine which face in different axial directions, constituting therefore a front side and a rear side, can be selectively acted upon by a pressure difference. Such a pressure difference makes it possible to apply an axially operative force to the turbine so as to cause an axial displacement of the turbine. The axial position of the turbine, and thus engagement and disengagement of the lockup clutch, can thus be controlled by suitably feeding pressure medium to the front side or to the rear side of the turbine.

In accordance with a further advantageous configuration of the invention, it is possible to provide on the turbine at least one piston means for frictionally coupling the turbine and the converter housing. In order to produce a condition of frictional coupling in that way, firstly a part of the torque is transmitted between the turbine and the converter housing by means of the piston means, in order thereby to facilitate the axial sliding movement of the turbine for definitively engaging the lockup clutch.

Further objects, features and advantages of the invention will be apparent from the description hereinafter of preferred embodiments of the invention.

DESCRIPTION OF PREFERRED EMBODIMENTS

Figure 1:
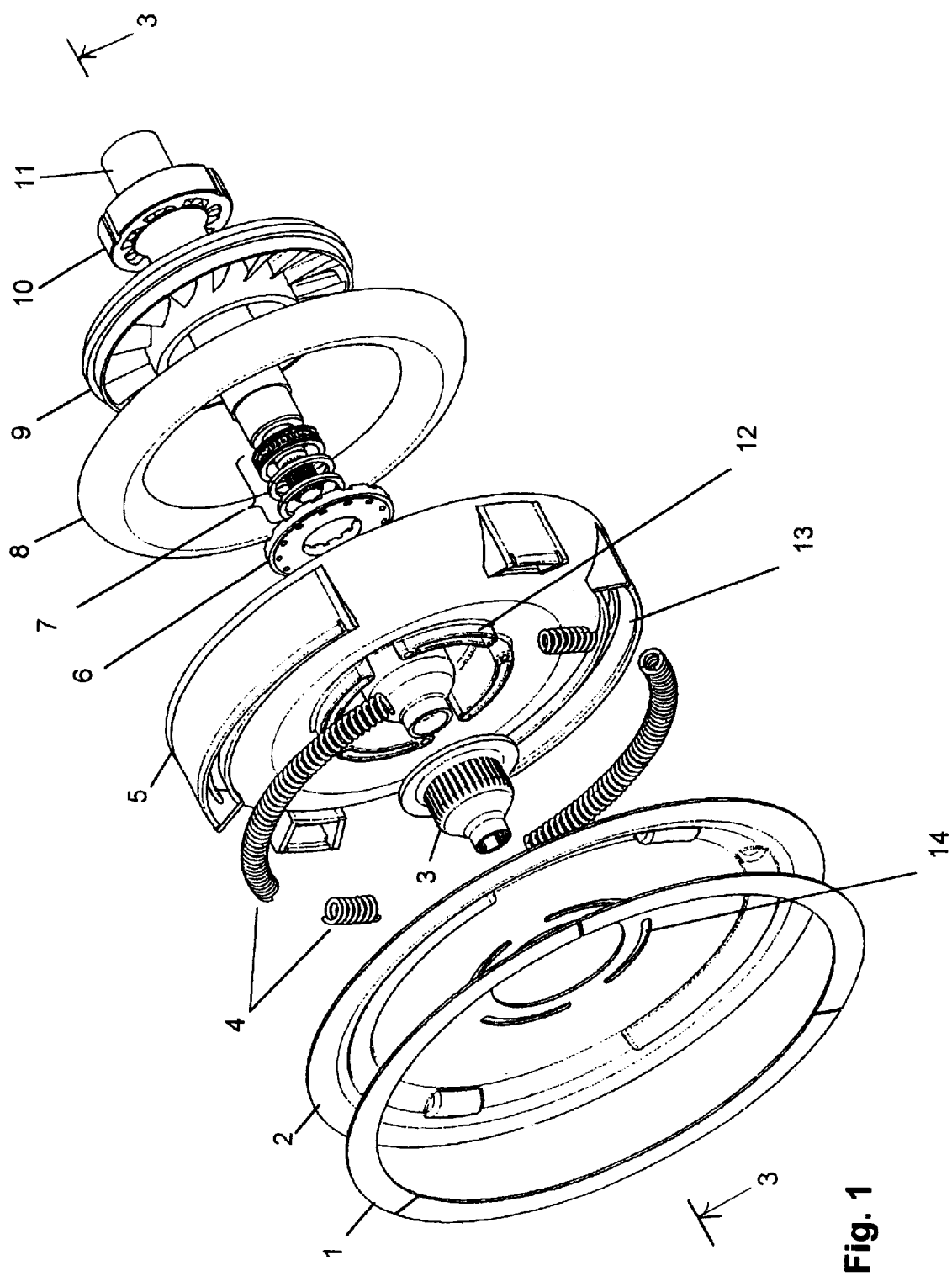
FIG. 1 is a front perspective exploded view of a first embodiment of a torque converter according to the invention.
Figure 2:
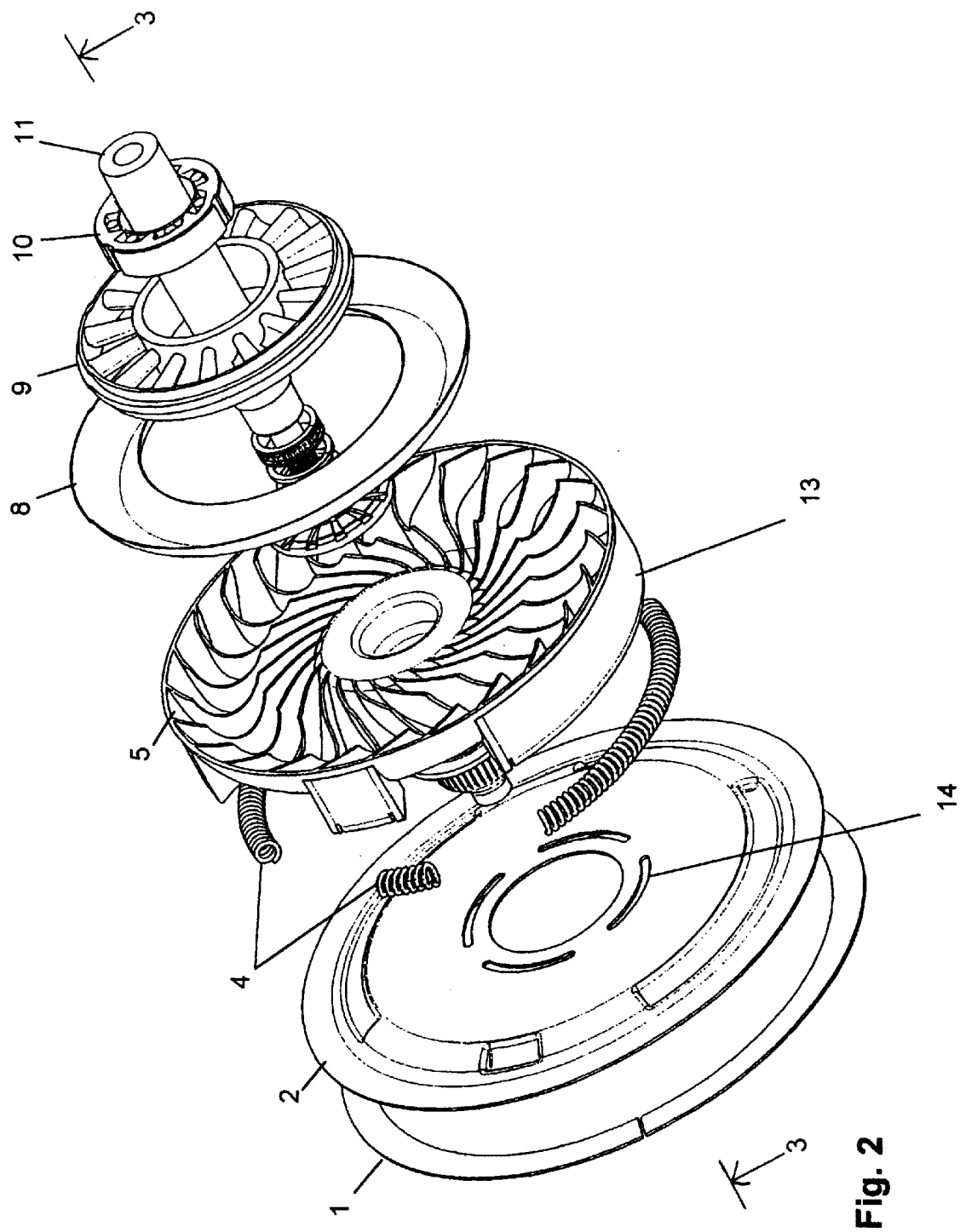
FIG. 2 is a rear perspective exploded view of the torque converter shown in FIG. 1.
Figure 3:
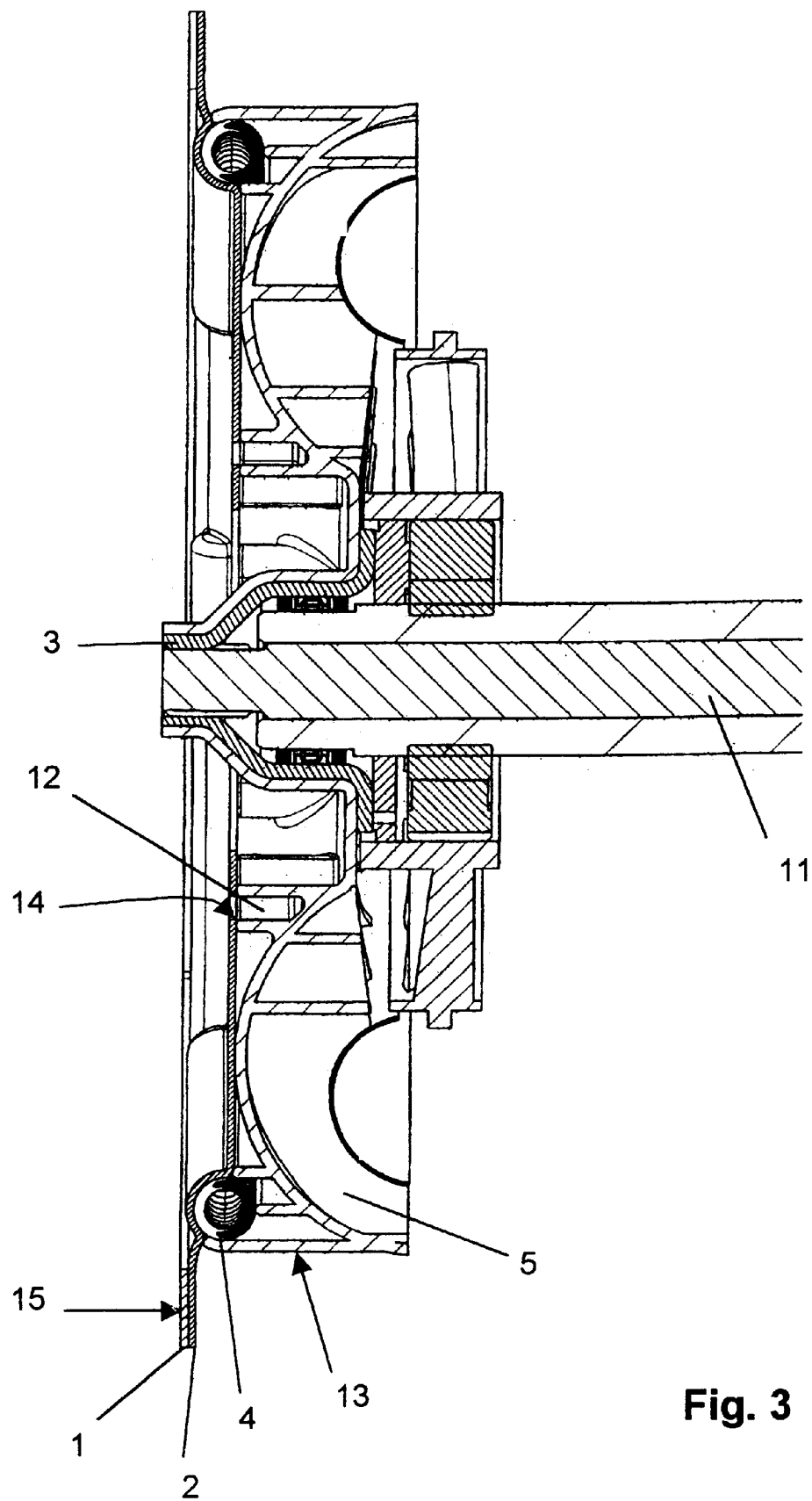
FIG. 3 is a view in cross-section through the assembled torque converter taken alone line 3—3 in FIGS. 1 and 2.

Reference will first be made to FIGS. 1 through 3 in which FIGS. 1 and 2, respectively, show views from the front, that is to say as seen from an internal combustion engine operatively associated in use with the torque converter, and from the rear, as an exploded view of the parts of a torque converter which are essential to the present invention. FIG. 3 in turn is a view in cross-section taken along the longitudinal axis of the torque converter or line 3—3, comprising the components shown in FIGS. 1 and 2, in the assembled condition.

Looking therefore at FIGS. 1 through 3, reference numeral 5 therein denotes a turbine that is non-rotatably connected to a drive output shaft 11. A torque received by the turbine 5 can thus be transmitted to the shaft 11. The turbine 5 is preferably produced by a pressure die casting process from a special aluminum alloy suitable for present purposes. The turbine 5 can be caused to rotate by a hydraulic medium such as in particular oil conveyed in a circulatory manner in the converter in per se known fashion. In that respect, the circuit of the hydraulic medium goes by way of the vanes of the turbine 5, by way of the vanes of a pump or impeller (not shown) which is connected to the converter housing (also not shown) which is driven in rotation by the internal combustion engine, and by way of a stator 9 which is carried on a freewheel 10, and back to the turbine 5 again. The advantage of torque transmission from the impeller to the turbine, by way of the hydraulic medium, is that this arrangement provides for gentler transmission of torque and it makes it possible to start without a clutch. For that reason hydrodynamic torque converters are generally used in connection with automatic transmissions, for example in automobile use.

When an approximately equal speed of rotation is reached as between the impeller and the turbine 5, a bridging or lockup clutch is preferably brought into operative engagement. The lockup clutch is operative in parallel relationship with the hydrodynamic coupling effect, and by way of friction surfaces, the lockup clutch produces a mechanical connection between the turbine 5 and the converter housing. In the case of the torque converter shown in FIGS. 1 through 3, the lockup clutch is formed by a friction ring 1 secured at the periphery to a coupling element 2. By means of suitable axial displacement, towards the left in FIG. 1, the friction ring 1 can come into frictional contact with a corresponding counterpart friction surface on the converter housing (not shown) and by way thereof can produce a non-rotatable coupling effect between the converter housing and the coupling element 2.

The coupling element 2 is provided with peripherally extending slots as indicated at 14 for securing the coupling element 2 secured to correspondingly extending securing passage portions 12 which protrude axially from the front side of the turbine 5. By a suitable securing action therefore it is possible to ensure radial relative rotary movement as between the coupling element 2 and the turbine 5, with such relative rotary movement being limited to a given angular range by virtue of the co-operation between the slots 14 and the projections 12.

The transmission of torque between the coupling element 2 and the turbine 5 takes place by way of spring members as indicated at 4, which are in the form of coil springs extending in the peripheral direction and arranged in receiving pockets 13 located at the edge of the outer shell portion of the turbine 5. The pockets 13 are formed by suitable projection portions on the periphery of the turbine 5. In this arrangement, the coil springs 4 can be fixed in position by bending over the upper edges of the receiving pockets 13, such edges being delimited by slots. By virtue of the fact that the springs 4, which act as oscillation-damping springs, are supported at a first end thereof on the turbine 5 and at another end thereof in a corresponding pocket on the coupling element 2, they are operatively disposed in serial relationship in the path of the transmission of force from the coupling element 2 to the turbine 5. In that way the damping springs 4 can filter out fluctuations and peaks of torque transmitted to the turbine 5.

Looking now more specifically at FIG. 3, reference numeral 15 therein denotes a friction ring friction surface on the friction ring 1. The friction ring friction surface 15 on the friction ring 1 is intended to be brought into contact with a corresponding counterpart converter housing friction surface on the converter housing (not shown), which in combination constitute a lockup clutch. In order to bring the friction ring friction surface 15 into contact with the corresponding converter housing friction surface, thereby moving the lockup clutch into the engaged condition, the turbine 5 is axially slidably supported on the shaft 11. The non-rotatable connection between the shaft 11 and the turbine 5, while at the same time affording axial slidability thereof, is achieved by the use of a suitable spline arrangement wherein the shaft 11 and the turbine 5 are in co-operating relationship. Therefore, the turbine 5, together with the coupling element 2 which is secured thereto and which carries the friction ring 1, can be moved in the axial direction towards the converter housing, being therefore towards the left in FIGS. 1 and 3. When such axial displacement of the turbine occurs, there is an increasing spacing of the turbine 5 from the impeller, which could possibly cause a degree of hydraulic slippage. That, however, is generally immaterial in terms of the functioning of the torque converter as in that condition the lockup clutch is engaged, and the hydrodynamic coupling action no longer plays any part in the transmission of torque.

Referring still to FIG. 3, reference numeral 3 therein denotes a hub which is disposed at the left-hand end of the shaft 11 and which is non-rotatably coupled to the turbine 5. It affords adequate torsional strength and affords axial and radial support on two bearing surfaces.

Figure 4A:
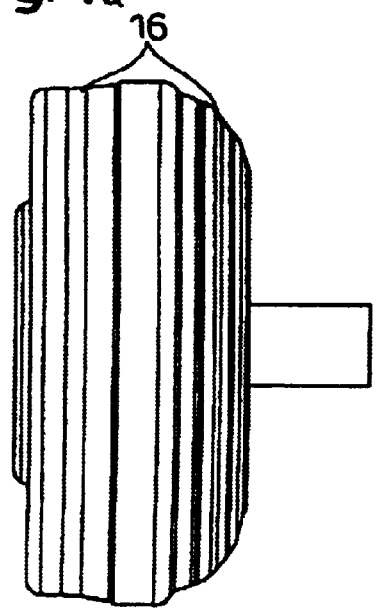
FIG. 4A is a side view of a second embodiment of the torque converter according to the invention.
Figure 4B:
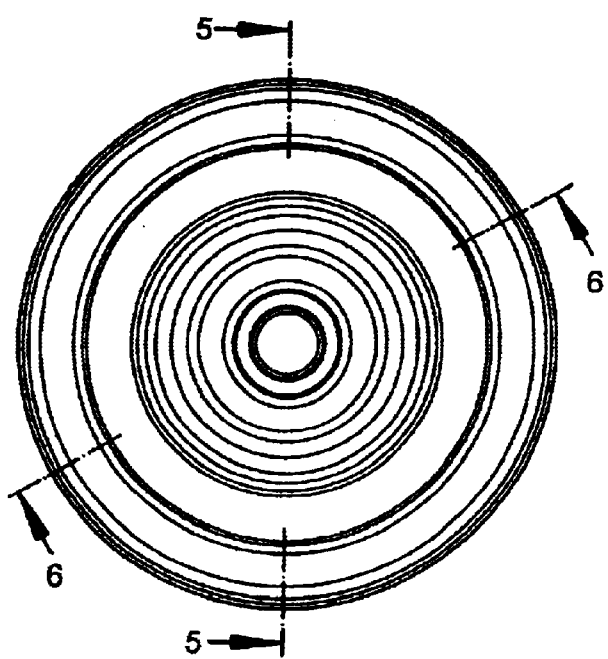
FIG. 4B is a front side view of a second embodiment of the torque converter according to the invention.
Figure 5:
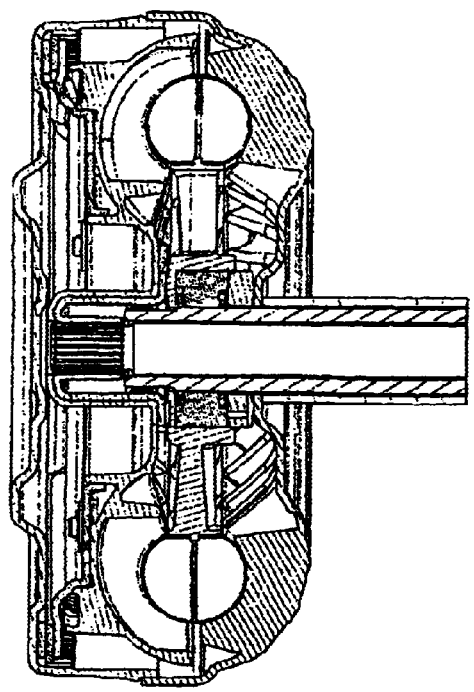
FIG. 5 is a view in cross-section taken along line 5—5 in FIG. 4B.
Figure 6:
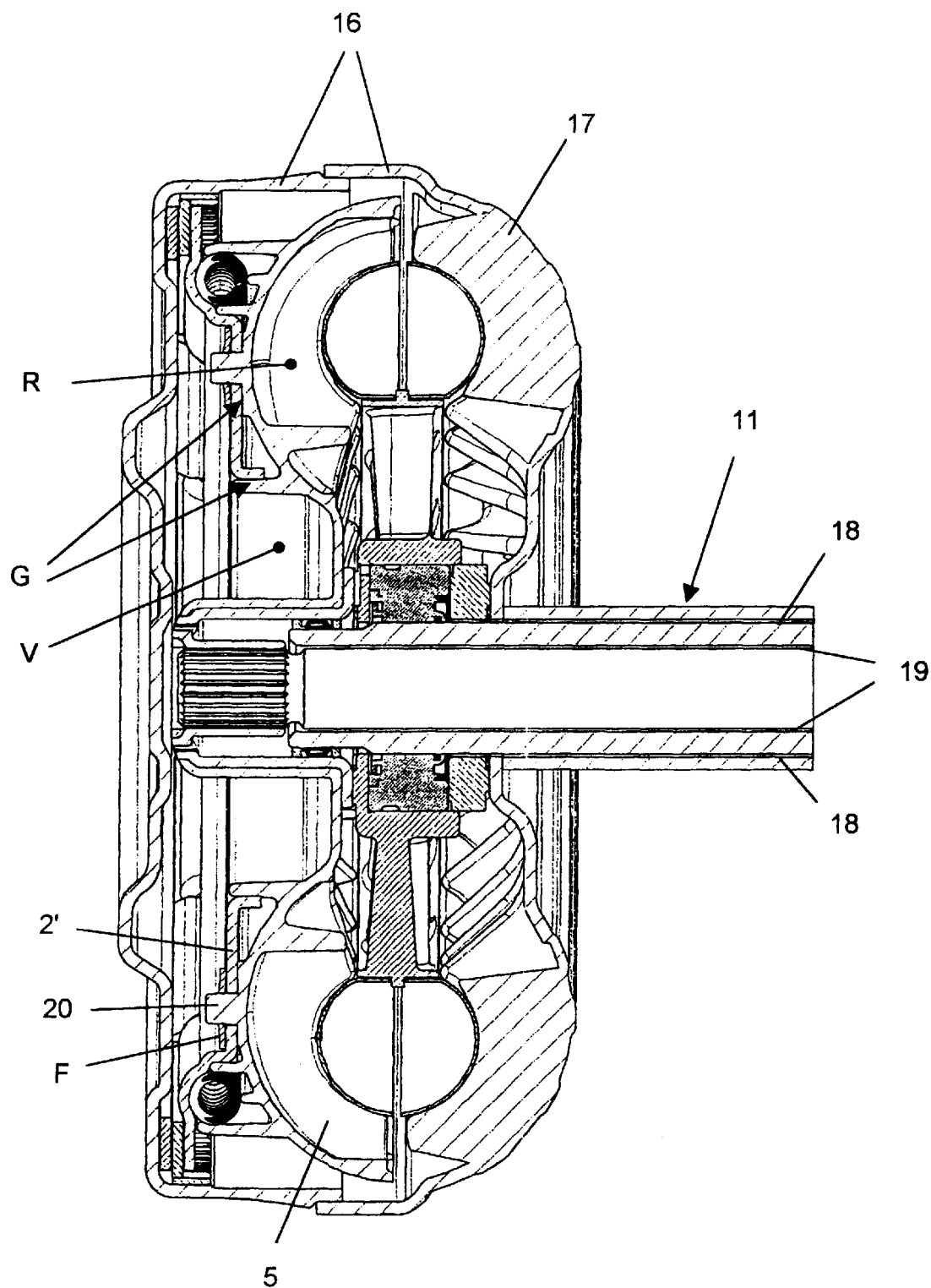
FIG. 6 is a view in cross-section taken along line 6—6 in FIG. 4B.

Reference will now be made to FIGS. 4, 5 and 6 showing a second embodiment of a torque converter according to the invention. In this respect, FIG. 4A shows a side view and FIG. 4B a front elevational view of the closed converter housing as indicated at 16. FIG. 5 is a view in section through the torque converter taken along line 5—5 in FIG. 4B while FIG. 6 shows a corresponding section taken along line 6—6 in FIG. 4B. The same components as in the embodiment described hereinbefore with reference to FIGS. 1 through 3 are denoted by the same references in FIGS. 4 through 6 and in the description hereinafter referring thereto. The Figures also show the converter housing 16 with the impeller 17 secured thereto.

It will first be noted that the structure shown in FIGS. 4, 5 and 6 is generally similar in its broad principles to that described hereinbefore with reference to FIGS. 1 through 3. A difference as between the embodiment of FIGS. 1 through 3 and FIGS. 4 through 6 lies in the manner of securing the coupling element indicated at 2 in FIGS. 1 through 3 and indicated at 2' in FIG. 6. The coupling element 2' in the second embodiment shown in FIG. 6 is provided with slots which are visible in FIG. 6 but which are not indicated by a reference numeral therein. The slots extend in the peripheral direction of the coupling element 2'. Projecting through the slots is a pin portion or projection indicated at 20. The projection 20 is provided on an outer shell portion of the turbine 5, which faces towards the converter housing 16, and the projection 20 protrudes axially from the outer shell portion. Fitted on the end of the projection is a spring ring F which urges the coupling element 2' with an adjustable pressure against the turbine 5. Axial and radial sliding surfaces as indicated at G are afforded between the coupling element 2' and the turbine 5. The spring ring F causes the coupling element 2' to be pressed with a defined pressure against those sliding surfaces G so that a condition of adequate sealing integrity is afforded at those surfaces. As the turbine 5 preferably comprises an aluminum alloy and the coupling element 2' preferably comprises steel, the sliding surfaces G have good sliding properties and a constant long-term performance. At the same time the damping characteristics of the torsion damper are determined by the friction occurring at the sliding surfaces G as, upon compression of the springs 4, a relative movement necessarily occurs along the sliding surfaces G.

The axial displacement of the turbine 5, which is necessary to bring the lockup clutch into the operative or engaged condition, can be produced by suitably acting on the two sides of the turbine 5, which face in different axial directions. For that purpose, provided in the shaft 11 are passages as indicated at 19, by way of which pressure medium can be passed into a front chamber as indicated at V between the turbine 5 and the converter housing. Also provided in the shaft 11 are passages as indicated at 18 by way of which the pressure medium can be passed into a rearward chamber (designated as reference letter R) located on the remote rear side of the turbine 5. An increased pressure obtaining in the front chamber V, in comparison with the rearward chamber R, produces an axial pressure away from the converter housing. That causes the lockup clutch to be opened or disengaged. Conversely a reduced pressure in the front chamber V in relation to the rearward chamber R causes the turbine 5 to be moved in the axial direction towards the converter housing, and that results in contact between the friction surfaces and thus engagement of the lockup clutch.

Figure 7:
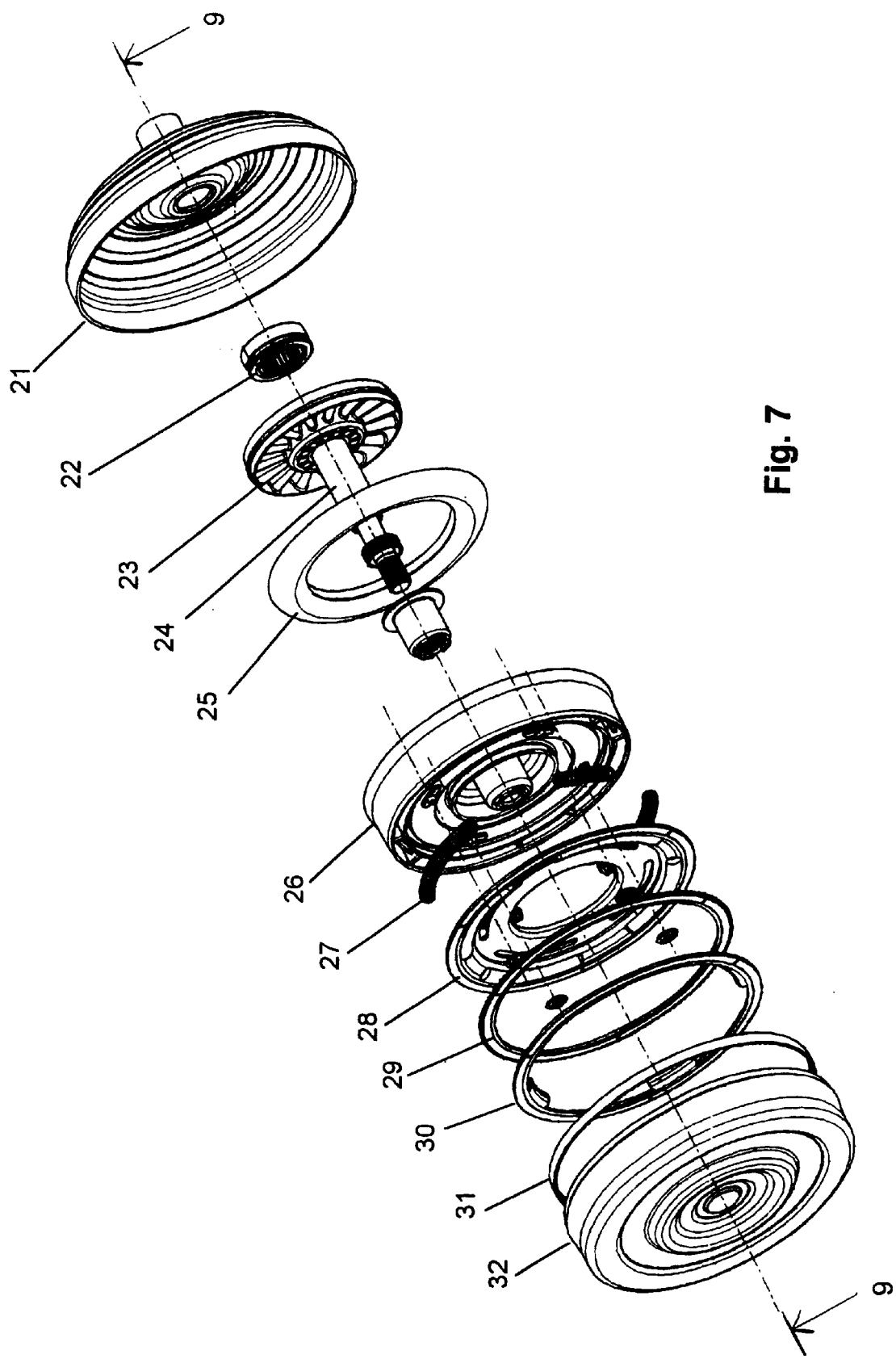
FIG. 7 is a front perspective exploded view of a third embodiment of the torque converter according to the invention.
Figure 8:
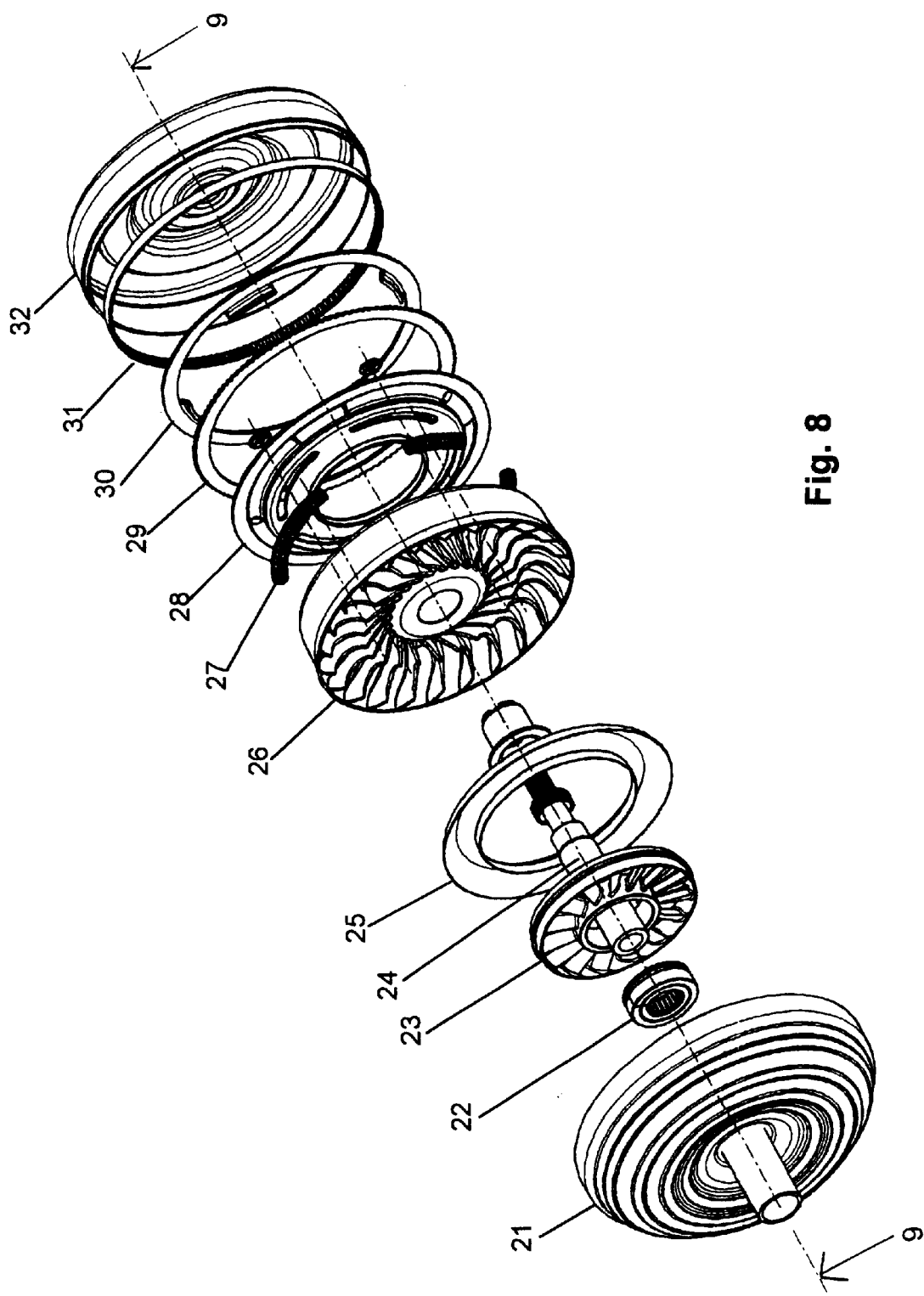
FIG. 8 is an rear perspective exploded view of the structure shown in FIG. 7.
Figure 9:
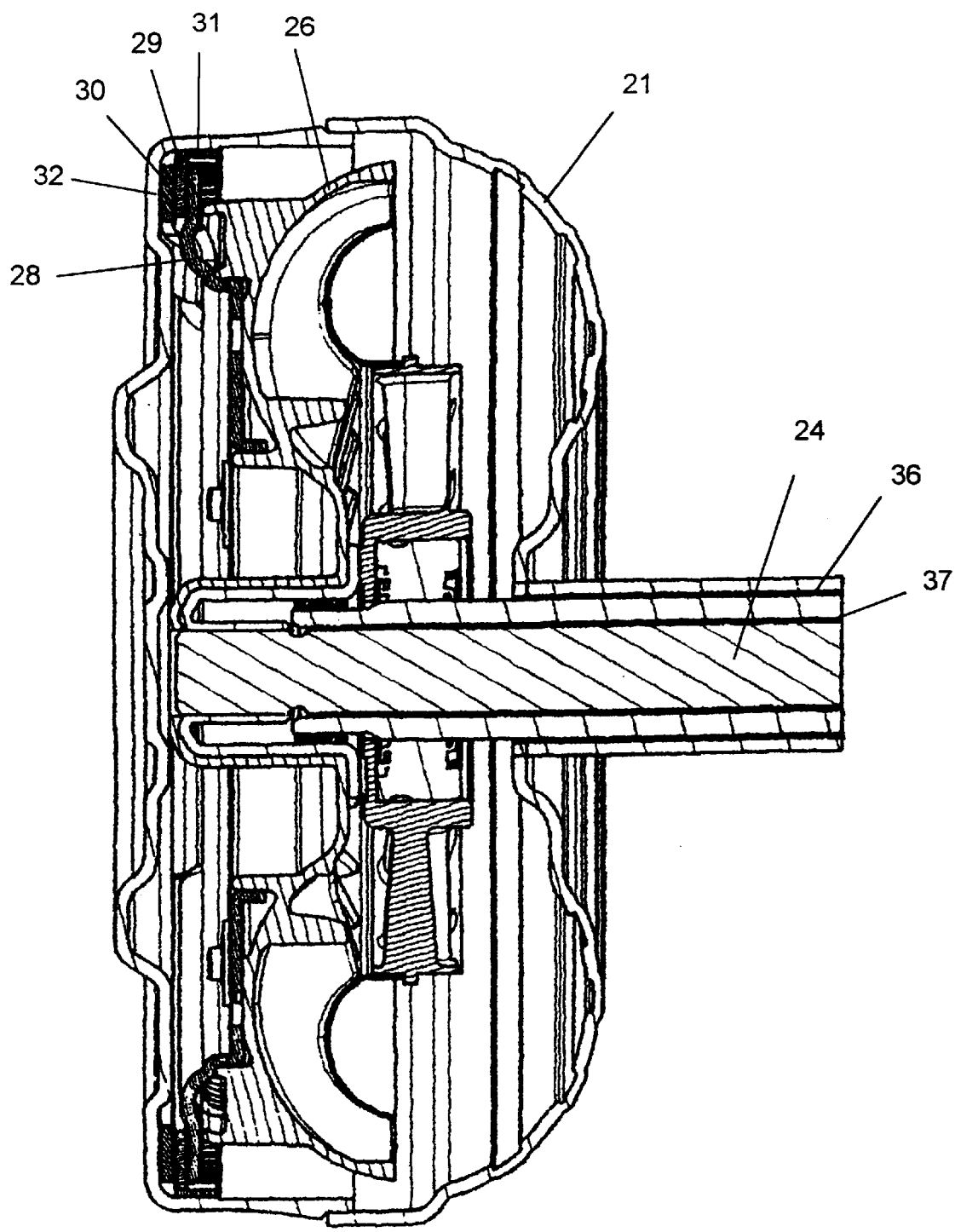
FIG. 9 is a view in cross-section through the assembled torque converter taken alone line 9—9 FIGS. 7 and 8.
Figure 10:
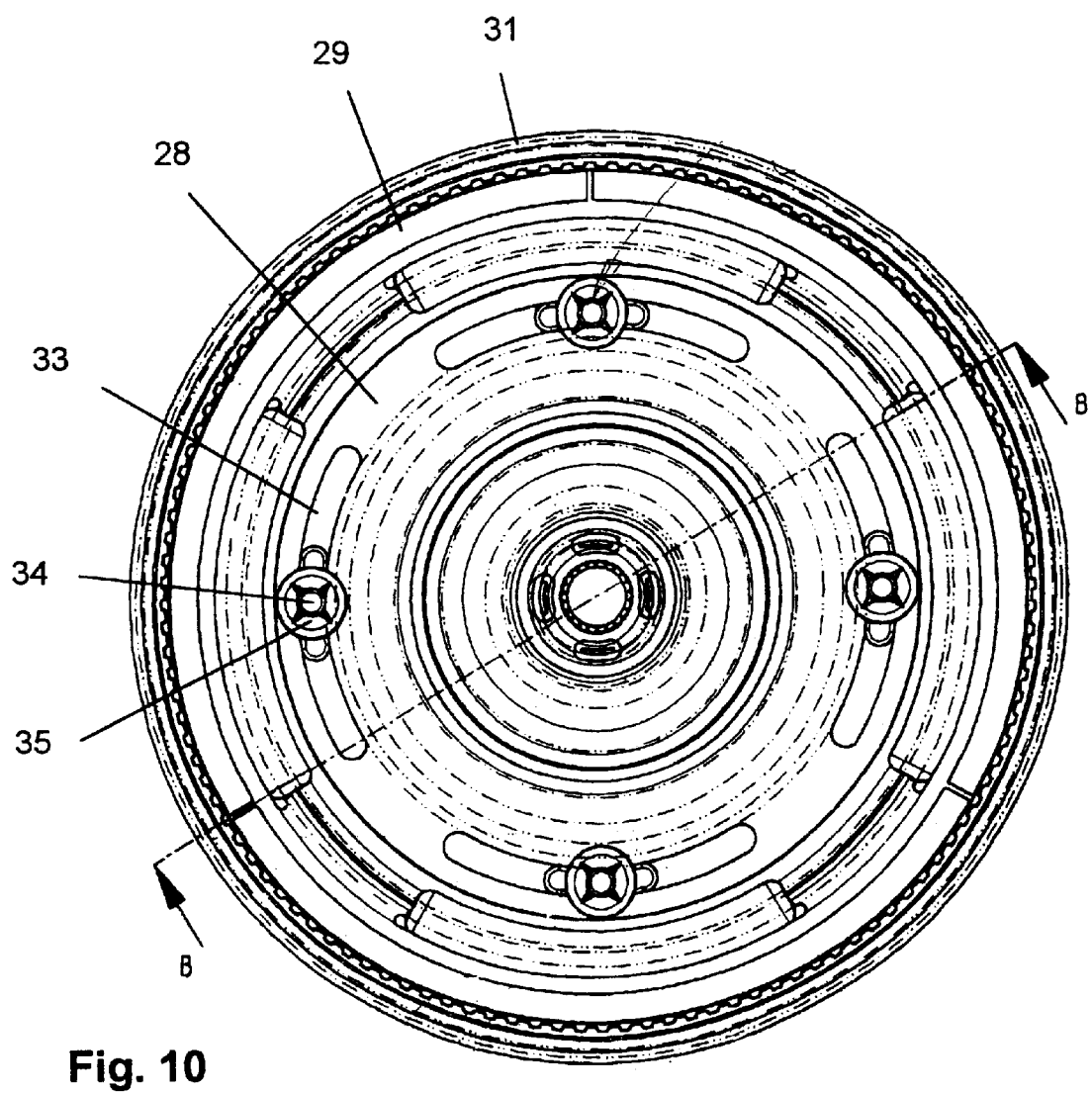
FIG. 10 is an elevational view of a coupling element of the torque converter shown in FIGS. 7 through 9.

Attention will now be drawn to FIGS. 7 through 10 showing a third embodiment of a torque converter in accordance with the principles of the invention. Therein FIGS. 7 and 8 show a perspective exploded view of the torque converter, viewing from the front end and from the rear end respectively. FIG. 9 is again a view in cross-section through the torque converter in the assembled condition and FIG. 10 is an elevational view of the coupling element of the torque converter. In this embodiment the friction ring comprises three components as denoted by references 29, 30 and 31.

It will be seen from the general views in FIGS. 7 and 8 that this structure of a torque converter according to the invention is broadly similar in its basic configuration to the torque converters described hereinbefore, and FIGS. 7 and 8 will therefore not be described again in full detail. The relevant components thereof, in which the torque converter illustrated in FIGS. 7 and 8 differs from the previous embodiments, will be described with reference to FIGS. 9 and 10.

Looking therefore now at FIG. 9, shown therein are two passages 36 and 37 extending through the drive shaft 24 in parallel relationship to the axis thereof. The passage 37 leads into a chamber between the coupling element 28 and the converter housing 32, while the other passage 36 leads into a chamber in which the turbine vanes 23 are disposed. Those two chambers are substantially isolated from each other by the turbine 26 and the coupling element 28, which is connected in sealing relationship to the turbine 26. Therefore, a pressure medium, such as in particular oil, can be introduced by way of the passage 37 into the chamber between the coupling element 28 and the converter housing 32 so as to build up a higher pressure than in the other chamber. The turbine 26 and the coupling element 28 is therefore urged in the axial direction away from the converter housing, towards the right in FIG. 9, so that the friction surfaces on the friction rings 29, 30 and 31 and on the converter housing 32 are urged away from each other. The lockup clutch is opened or disengaged in that situation.

In contrast, if the pressure of the supplied hydraulic medium is reduced by way of the passage 37 and, consequently, there is a lower pressure in the chamber between the coupling element 28 and the converter housing 32 than in the turbine chamber, the turbine 26 is moved in the axial direction towards the converter housing, towards the left in FIG. 9, by the higher pressure in the turbine chamber causing the friction surfaces to come into contact and thus causes closure or engagement of the lockup clutch.

The view on to the coupling element 28 in FIG. 10 clearly shows the plurality of peripherally extending slots 33 and the projections 34 which respectively pass therethrough. Reference 35 denotes spring rings which are fitted on the projections 34 to produce a contact pressure thereat, in a similar manner to that described hereinbefore with reference to the preceding embodiments.

Figure 11:
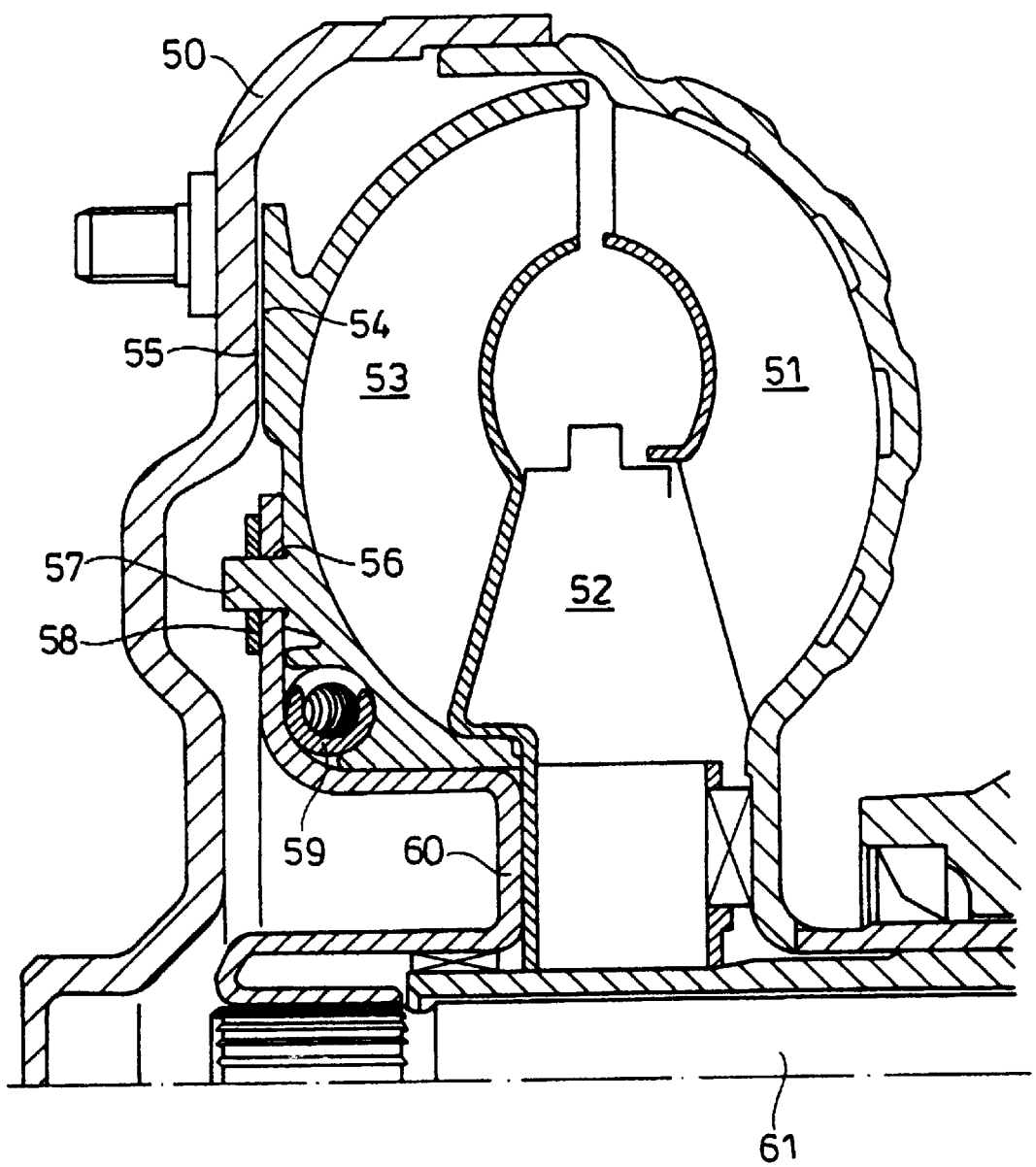
FIG. 11 is a view in cross-section through a fourth embodiment of the torque converter according to the invention, in which an outer shell portion of the turbine comes directly into frictional contact with the converter housing.

FIG. 11 is a view in cross-section showing part of a fourth embodiment of a torque converter according to the invention. In FIG. 11 reference 50 denotes the converter housing, reference 51 denotes the impeller connected to the converter housing 50, reference 52 denotes the stator and reference 53 denotes the turbine. The vanes of the impeller 51, stator 52 and turbine 53 form a closed hydrodynamic circuit in which circulating oil forms a coupling between the impeller 51 and the turbine 53.

At its outer shell portion, which is towards the converter housing 50, the turbine 53 has a turbine friction surface 54 which is disposed in opposite relationship and at an axial spacing in relation to a corresponding counterpart converter housing friction surface 55 located on the converter housing 50. By virtue of axial displacement of the turbine 53 towards the converter housing 50, being therefore towards the left in FIG. 11, the two friction surfaces 54 and 55 can come into contact with each other and thus produce a force-locking connection between the converter housing 50 and the turbine 53. In that condition, the lockup clutch of the torque converter is engaged. Direct coupling of the turbine 53 and the converter housing 50 is made possible by virtue of the fact that the turbine 53 is axially slidably supported on the shaft as indicated at 61.

The turbine 53 is connected to the shaft 61 by way of a coupling element 60. The coupling element 60 is arranged with one end non-rotatably mounted on the shaft 61. The other end of the coupling element 60, which projects radially outwardly, has slots 56 which extend in the peripheral direction and through which extend projections 57 which protrude axially from the outer shell portion of the turbine 53. The projections 57 are fixed in position after having passed through the slots 56 by a spring plate or diaphragm spring 58 that presses the coupling element 60 with a defined pressure against the turbine 53. In that way the sliding surfaces as between the coupling element 60 and the turbine 53 are brought into sealing contact with each other.

A coil spring 59 is disposed in a receiving groove provided on the outer shell portion of the turbine 53. Preferably, the torque converter has a plurality of such coil springs 59 distributed at least substantially uniformly over the periphery of the turbine 53. The coil spring 59 is supported at one end on the turbine 53 while the other end thereof is supported on the coupling element 60. In that way, the coil spring 59 is inserted in serial relationship into the path of the transmission of force from the turbine 53 to the coupling element 60 so that the spring 59 can dampen torque peaks and fluctuations.

In this embodiment, the torsion damper formed by the coil spring 59 is arranged in the connecting path between the turbine 53 and the shaft 61 so that it detects and damps all torque peaks, irrespective of whether they are transmitted to the turbine by way of the lockup clutch or the hydraulic coupling.

Figure 12:
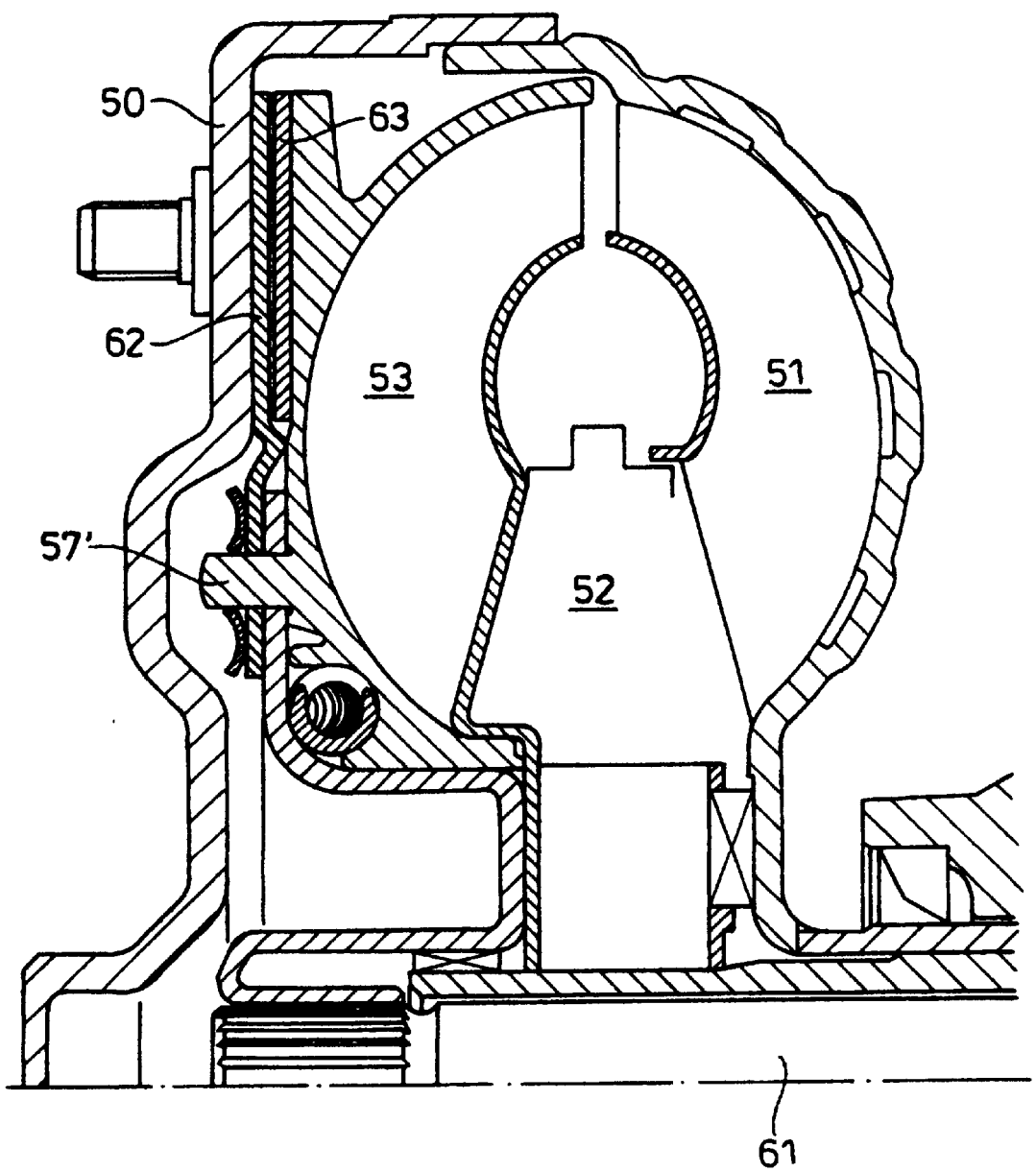
FIG. 12 is a view similar to FIG. 11 showing a modification of the embodiment illustrated therein.

Reference will now be made to FIG. 12 showing a similar embodiment of the torque converter to FIG. 11, but in which a further annular element 62 is fixed on the projection 57' which is arranged in axially protruding relationship on the outer shell portion of the turbine 53. The annular element 62 extends into the gap between the friction surfaces on the converter housing and on the outer shell portion of the turbine.

The friction surfaces on the converter housing 55 on the one hand and on the outer shell portion of the turbine 63 on the other hand can be of a particular nature or configuration in order to provide a desired frictional mode of performance. For example they may comprise aluminum and/or steel. More particularly the annular element 62 may comprise aluminum and the friction surface 63 in relation to the turbine 53 may comprise steel. Aluminum surfaces may be provided with oil channels extending in a spiral configuration. It is equally possible for aluminum to be combined with ceramic material. Finally, it is also a possibility for the friction surfaces to be coated in the usual manner with friction paper glued on to one of the surfaces.

The springs used in the torsion dampers perform a plurality of functions. On the one hand they isolate and damp the torsional vibrations originating from the internal combustion engine. On the other hand they reduce and dampen initial vibration from the turbine and the impeller. Finally they absorb engagement shocks when gearshift procedures are implemented and upon engagement of the lockup clutch.

Figure 13:
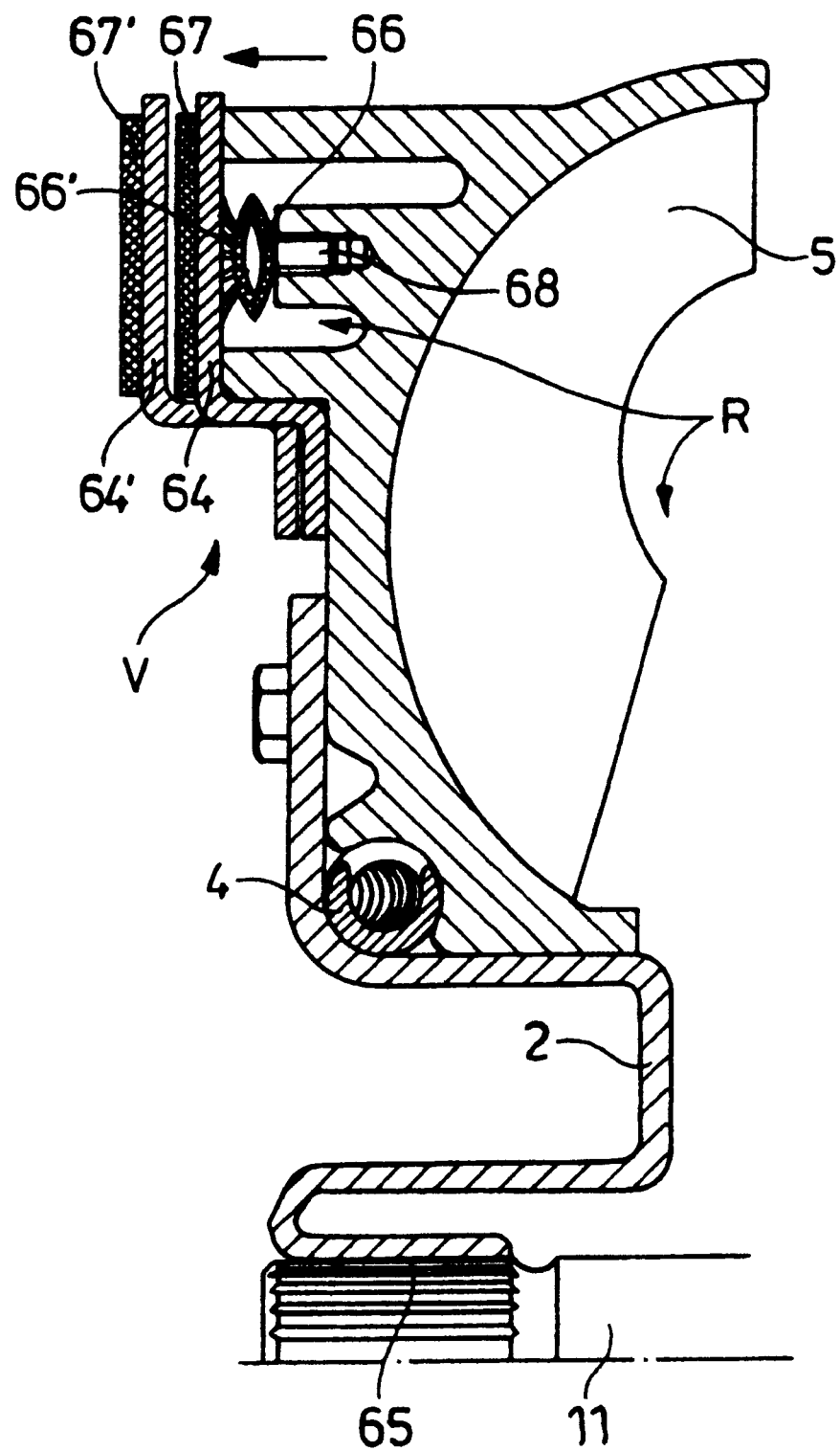
FIG. 13 is a diagrammatic view of part of a further embodiment of the torque converter according to the invention.

Looking now at FIG. 13, shown therein is a diagrammatic view of a further embodiment of the invention which is suitable in particular for torque converters in which only a relatively low hydraulic pressure is available for operating the lockup clutch. When relatively low hydraulic pressures are available, a problem which can occur is that the hydraulic forces produced are not sufficient to displace the turbine 5 axially on its mounting shaft if a high torque is being transmitted by way of the spline arrangement as indicated at 65 (which forms the operative connection between the turbine 5 and the shaft 11), as axial displacement of the turbine 5 along the splines 65 is made more difficult by virtue of the lateral forces acting on the splines. In order initially to relieve the load on the splines 65, the embodiment illustrated in FIG. 13 includes in the outer region of the turbine 5 a separate piston 64, which is illustrated in first and second positions in FIG. 13, which are indicated as 64 and 64', respectively. The piston 64 can press a friction surface (indicated as 67 or 67' for the first and second positions, respectively) against a corresponding friction surface on the converter housing (not shown).

The piston 64, which is of a generally annular configuration, is supported by way of suitable guide means, for example pins or bolts, non-rotatably but axially displaceably with respect to the turbine 5. The piston 64 is subjected to the force from the chamber R towards the turbine 5, with the hydraulic pressure respectively obtaining therein, and hydraulically seals off the chamber R in relation to the front chamber V, which is in the region of the converter housing.

The coupling procedure takes place in the following fashion: initially the piston 64 is in a retracted condition as indicated by references 64 and 67, which is to say towards the right in FIG. 13. The pressure of the hydraulic medium in the chamber R is increased in comparison with the pressure in the chamber V. At just a relatively low pressure the piston 64 moves or extends in the direction indicated by the arrow shown at the top in FIG. 13 and in so doing presses the friction surface 67 against the friction surface (not shown) of the converter housing so that the piston 64 and the friction surface 67 thereof then assume the positions indicated by 64' and 67' respectively. In that way at least a part of the torque between the turbine 5 and the converter housing is already being transmitted by way of that frictional engagement whereby the spline arrangement 65 is relieved of load so that axial displacement of the turbine 5 on the shaft 11 is facilitated thereby. In that way finally the entire turbine 5 can be axially displaced in the direction of the housing, in accordance with the pressure drop between the chambers R, V, until all friction surfaces are in a condition of bearing against each other and the coupling or engagement procedure is completely concluded. The movement of the piston 64 can be assisted by a snap-action spring 66 or 66' which is fixed in a holder 68 to the turbine 5, and which urges the piston 64 into its respective limit positions.

A distinction is to be drawn between the following conditions, in operation of the torque converter:

a) Starting the engine and idling: the crankshaft turns the torque converter and the pump and the oil pump fills the converter. The pressure in the space between the converter housing and the turbine is higher than in the rest of the converter housing. The difference in oil pressure moves the impeller and the lockup clutch and separates the friction surfaces from the converter housing. There is virtually no transfer of torque to the output shaft because of the small difference in speed between the turbine and the impeller.
   b) With a rising engine speed and a reducing difference in speed between the turbine and the impeller, which results in a lower level of circulation of oil, the efficiency in terms of torque conversion rises.
   c) Depending on the mode of travel of the vehicle in which the engine is fitted and the commands from the central management system the bypass valve or spool interrupts the feed of oil to the space between the converter housing and the turbine and the pressure in that space drops as a result. The turbine thereupon again moves in the direction of the converter housing. As a result of that movement of the turbine the friction surfaces on the coupling element and the converter housing come into contact with each other, thereby providing for a condition of direct coupling between the engine and the output shaft of the torque converter.
   d) As the friction surfaces are only indirectly operably associated with the output shaft by way of the springs, shock energy is absorbed by the springs and by the friction between the steel plates and the turbine.

It will be noted that the torque converter according to the invention can be particularly suitably used for engines that involve a high level of vibration. As such engines are typically used in relatively small vehicles the amount of space required for power transmission must accordingly be limited to an absolute minimum. The compact torque converter configuration achieved in accordance with the invention can make a considerable contribution in that respect.

It will be appreciated that the above-described embodiments of the invention have been set forth solely by way of example and illustration of the principles thereof and that various other modifications and alterations may be made therein without thereby departing from the spirit and scope of the invention.

What is claimed is:

1. A hydrodynamic torque converter comprising:

an input drive means;

a shaft;

a converter housing rotatable about the shaft and connected to the drive means;

an impeller connected to the converter housing;

a turbine coupled to the shaft and adapted to be hydrodynamically coupled to the impeller;

means for supporting the turbine rotatably and axially slidably relative to the converter housing;

a lockup clutch including a friction surface operably associated with the converter housing and a friction surface operably associated with the turbine, the lockup clutch being operable to produce friction coupling between the friction surfaces, wherein the friction surfaces can be brought into and out of frictional contact by axial displacement of the axially slidably support turbine;

a torsion damper operably disposed between the turbine and the friction surface operatively associated therewith for dampening torsional shock between the drive means and the shaft;

a coupling element operably associated with the turbine, wherein the turbine includes an outer shell portion and the torsion damper includes at least one peripherally extending spring mounted to the outer shell portion of the turbine, the spring having a first end supported on the turbine and a second end supported on the coupling element;

a projection protruding axially from the outer shell portion of the turbine, wherein the coupling element has at least one peripherally extending slot into which the projection protrudes; and means for sealing the slot relative to the projection.

2. A hydrodynamic torque converter comprising:

an input drive means;

a shaft;

a converter housing rotatable about the shaft and connected to the drive means;

an impeller connected to the converter housing;

a turbine coupled to the shaft and adapted to be hydrodynamically coupled to the impeller;

means for supporting the turbine rotatably and axially slidably relative to the converter housing;

a lockup clutch including a friction surface operably associated with the converter housing and a friction surface operably associated with the turbine, the lockup clutch being operable to produce friction coupling between the friction surfaces, wherein the friction surfaces can be brought into and out of frictional contact by axial displacement of the axially slidably support turbine;

a torsion damper operably disposed between the turbine and the friction surface operatively associated therewith for dampening torsional shock between the drive means and the shaft; and a coupling element operably associated with the turbine, wherein the turbine includes an outer shell portion and the torsion damper includes at least one peripherally extending spring mounted to the outer shell portion of the turbine, the spring having a first end supported on the turbine and a second end supported on the coupling element, and wherein the friction surface operably associated with the turbine is located on the coupling element.

3. A hydrodynamic torque converter comprising:

an input drive means;

a shaft;

a converter housing rotatable about the shaft and connected to the drive means;

an impeller connected to the converter housing;

a turbine coupled to the shaft and adapted to be hydrodynamically coupled to the impeller;

means for supporting the turbine rotatably and axially slidably relative to the converter housing;

a lockup clutch including a friction surface operably associated with the converter housing and a friction surface operably associated with the turbine, the lockup clutch being operable to produce friction coupling between the friction surfaces, wherein the friction surfaces can be brought into and out of frictional contact by axial displacement of the axially slidably support turbine;

a torsion damper operably disposed between the turbine and the friction surface operatively associated therewith for dampening torsional shock between the drive means and the shaft; and a coupling element operably associated with the turbine, wherein the turbine includes an outer shell portion and the torsion damper includes at least one peripherally extending spring mounted to the outer shell portion of the turbine, the spring having a first end supported on the turbine and a second end supported on the coupling element, wherein the outer shell portion of the turbine has outwardly arranged projection portions in the form of an integral casting for holding the spring, and wherein the spring is held axially towards the center of the turbine by flanging the outer edges of the peripheral surfaces of the projection portions.

4. A hydrodynamic torque converter comprising:

an input drive means;

a shaft;

a converter housing rotatable about the shaft and connected to the drive means;

an impeller connected to the converter housing;

a turbine coupled to the shaft and adapted to be hydrodynamically coupled to the impeller;

means for supporting the turbine rotatably and axially slidably relative to the converter housing;

a lockup clutch including a friction surface operably associated with the converter housing and a friction surface operably associated with the turbine, the lockup clutch being operable to produce friction coupling between the friction surfaces, wherein the friction surfaces can be brought into and out of frictional contact by axial displacement of the axially slidably support turbine;

a torsion damper operably disposed between the turbine and the friction surface operatively associated therewith for dampening torsional shock between the drive means and the shaft; and a coupling element operably associated with the turbine, wherein the turbine includes an outer shell portion and the torsion damper includes at least one peripherally extending spring mounted to the outer shell portion of the turbine, the spring having a first end supported on the turbine and a second end supported on the coupling element, wherein the outer shell portion of the turbine has outwardly arranged projection portions in the form of an integral casting for holding the spring, and wherein the spring is held axially towards the center of the turbine by bending over the outer edges of the peripheral surfaces of the projection portions.

5. A hydrodynamic torque converter comprising:

an input drive means;

a shaft;

a converter housing rotatable about the shaft and connected to the drive means;

an impeller connected to the converter housing;

a turbine coupled to the shaft and adapted to be hydrodynamically coupled to the impeller;

means for supporting the turbine rotatably and axially slidably relative to the converter housing;

a lockup clutch including a friction surface operably associated with the converter housing and a friction surface operably associated with the turbine, the lockup clutch being operable to produce friction coupling between the friction surfaces, wherein the friction surfaces can be brought into and out of frictional contact by axial displacement of the axially slidably support turbine;

a torsion damper operably disposed between the turbine and the friction surface operatively associated therewith for dampening torsional shock between the drive means and the shaft;

a coupling element operably associated with the turbine, wherein the turbine includes an outer shell portion and the torsion damper includes at least one peripherally extending spring mounted to the outer shell portion of the turbine, the spring having a first end supported on the turbine and a second end supported on the coupling element; and at least one piston means associated with the turbine and the coupling element movable from a retracted position to an extended position to frictionally couple with at least one friction surface on the converter housing, wherein the at least one piston means is arranged in the outer peripheral region of the turbine and includes a movable piston guided in parallel relationship with the axis of the converter, means for supplying hydraulic pressure medium to the space towards the turbine, means for sealing off the piston with respect to the space remote from the turbine and a friction surface on the piston adapted to come into contact with the at least one friction surface on the converter housing, wherein the piston means has a snap-action spring operable to support the piston in the movement thereof into its respective limit positions.

6. A hydrodynamic torque converter comprising:

an input drive means;

a shaft;

a converter housing rotatable about the shaft and connected to the drive means;

an impeller connected to the converter housing;

a turbine coupled to the shaft and adapted to be hydrodynamically coupled to the impeller;

means for supporting the turbine rotatably and axially slidably relative to the converter housing;

a lockup clutch including a friction surface operably associated with the converter housing and a friction surface operably associated with the turbine, the lockup clutch being operable to produce friction coupling between the friction surfaces, wherein the friction surfaces can be brought into and out of frictional contact by axial displacement of the axially slidably support turbine;

a torsion damper operably disposed between the turbine and the friction surface operatively associated therewith for dampening torsional shock between the drive means and the shaft;

a coupling element operably associated with the turbine, wherein the turbine includes an outer shell portion and the torsion damper includes at least one peripherally extending spring mounted to the outer shell portion of the turbine, the spring having a first end supported on the turbine and a second end supported on the coupling element;

at least one piston means associated with the turbine and the coupling element movable from a retracted position to an extended position to frictionally couple with at least one friction surface on the converter housing, wherein the at least one piston means is arranged in the outer peripheral region of the turbine and includes a movable piston guided in parallel relationship with the axis of the converter, means for supplying hydraulic pressure medium to the space towards the turbine, means for sealing off the piston with respect to the space remote from the turbine, a friction surface on the piston adapted to come into contact with the at least one friction surface on the converter housing; and means for setting an increased pressure in a space towards the turbine in relation to a space remote from the turbine causing actuation of the piston means to a position in which at least a part of the torque is transmitted between the turbine and the converter housing, whereby torque acting between the shaft on which the turbine is axially slidably supported and the turbine is reduced, and correspondingly axial sliding movement of the turbine with respect to the shaft to produce a complete condition of frictional coupling is facilitated.

* * * * *